Reissued June 30, 1942 Re. 22,127

UNITED STATES PATENT OFFICE 22,127

COMPOSITION OF MATTER AND PROCESS OF PREPARING THE SAME

Joseph E. Plumstead, Wilmington, Del., assignor by mesne assignments, to West Virginia Pulp & Paper Company, New York, N. Y., a corporation of Delaware No Drawing. Original No. 2,186,040 dated January 9, 1940, Serial No. 746,266, September 29, 1934, which is a division of Serial No. 679,993, July 11, 1933. Application for reissue November 16, 1940, Serial No. 365,992. Renewed December 27, 1938

18 Claims. (Cl. 106—306)

This invention relates to a loading material, filler, or pigment, and to the manufacture thereof, and more particularly to methods of treating finely divided solid materials to improve their characteristics as fillers, pigments, or loading materials for use in various materials.

An object of the present invention is to provide pigment or filler material having highly desirable characteristics. Another object is to provide a method of treating pigment or filler material by which particularly its opacity is improved.

By the process of the present invention, a material which is ordinarily employed as a pigment or filler, or in the manufacture thereof, may be converted into a highly improved product by treating a suspension of particles of the material in a fluid with a reagent which will effect selective removal of portions of the particles whereby the particles are rendered spongy, vesicular and amorphous in character and whereby the regularity and angularity of shape of the particles are destroyed. This causes the particles to have a greater liquid absorptivity and what is more important a greater hiding power, greater opacity, increased softness and smoother surface characteristics when used as fillers, or pigments.

The percentage of retention of such treated particles is increased due to the increased clinging characteristics of the honeycomb surface structure. A pigment substance, and a chemical reagent which affects the surface of pigment particles by removing matter from their surfaces and in certain instances by adding matter to their surfaces, as for example, by precipitation of substances thereon, are employed in the present process. The qualities of the final product are greatly influenced by the physical shape and chemical reactivity of the initial pigment material.

For example, a suspension of calcium-magnesium hydroxides prepared by slaking burned dolomitic lime will include finely comminuted particles in which the magnesium portion is more readily dissolved by common acidic materials than the calcium portion. The result of this method in comparison to treating a finely comminuted dolomitic limestone is that the resultant vesicular pigment whether it be in the form of carbonate, sulphite, sulphate, or a mixture of these, with the hydroxides of the aforementioned slaked material will be a better product when prepared from the latter material than when prepared from the ground limestone. The product prepared from ground limestone may, however, be made very nearly equal in quality to that prepared from slaked lime if the product obtained after treatment with the reagent is finally wet ground for instance.

The present invention includes the treatment with acidic material of alkaline earth carbonate, hydroxide, sulphate or sulphite particles in suspension to form wholly or partly soluble acid salts. After the formation of such salts there may be a treatment of the acid salt solution either after separation of the solution from the suspended unreacted portions of the particles or while the latter particles are still mixed with the solution. In order to wholly or partially neutralize the acid salt solution and so that the whole or part of the base portion of the acid salt will be precipitated as additional pigment material.

The above process may be varied to form at least three types of pigments. One is the pigment residue obtained by the treatment with reagents; an amorphous type having a honeycomb structure and being vesicular. This may or may not be ground and may or may not be dried. Another type includes a combination of the pigment residue of honeycomb structure with a precipitated pigment which may be wholly amorphous or amorphous and crystalline. Still another type includes a precipitated pigment which may be wholly crystalline or wholly amorphous, or a combination of the two.

In the manufacture of cooking acid for use in digesting pulp in the so-called sulphite process, a sulphurous acid solution of calcium bisulphite or calcium and magnesium bisulphites has been used for many years. I have found it to be particularly advantageous from an economic standpoint to produce my pigment product by the process of the present invention while preparing the cooking acid. Accordingly, the cooking acid is prepared from lime-bearing substances, such as finely divided calcium limestone, or dolomitic limestone, or slaked lime from either of these limestones, and sulphur dioxide in the presence of water by carrying out the usual acid making operation to partial completion only. In this instance, suspended particles of the lime and/or magnesium material are removed from the acid either by filtering, decanting, or otherwise, before being completely reacted upon. The resultant solution or filtrate is employed in the usual sulphite pulp digesting process, and the filter cake may be washed or treated with milk of lime and employed as a filler or pigment.

A method of preparing my product may be outlined in a general way as follows:

(1) Burn dolomitic limestone.

(2) Slake dolomitic lime.

(3) Treat with sulphurous acid to dissolve part of suspension.

(4) Filter or separate solids from liquids and wash to dissolve out soluble substances or instead of the filtering operation treat with an alkaline earth hydroxide to precipitate dissolved substances.

Another method is one which may be used with calcium lime by including steps one and two as above and proceeding as follows:

(3) Treat the hydroxide with sufficient acidic material to convert the hydroxide into the salt of the acid.

(4) Add enough more of the acid to partially dissolve the salt and form the amorphous compound in aqueous suspension.

(5) Add a basic metallic or alkaline salt such as carbonate or hydroxide to react with the dissolved acid salt formed in 4 so that the normal salt will be thrown down as additional pigment material.

In carrying out the process with finely ground limestone material the steps are as follows:

(1) Grind the limestone material as finely as may be desired.

(2) Treat the ground limestone material with an acidic selective solvent such as carbonic acid solution, sulphurous acid, sulphurous acid solution of bisulphite or sulphuric acid to partial, selective dissolving or a corroded state.

(3) Treat the resultant material of step 2 with a basic metallic or alkaline salt such as carbonate or hydroxide or filter off dissolved salt for recovery or wasting.

(4) Grind and dry or dry and grind as may be desired.

Carbonate particles treated in accordance with the present process have substantially the same or a greater degree of opacity when compared with particles of domestic clays or China clays or kaolins of similar color and of approximately the same size. The treated carbonate particles have no definite crystalline formation, but on the contrary are sponge-like, pitted bodies having corroded edges which are visible when examined under a high powered microscope. The elimination of sharp edges from crystalline particles renders the product highly desirable for many purposes.

The spongy character of my product is indicated by its high water holding power even when subjected to reduced pressures below atmospheric. Ordinary precipitated or crystalline calcium carbonate when matted to a one-half inch cake on the plate of a vacuum press and subjected to 18 inches of vacuum for a period of three minutes will test less than 40% moisture. Calcium carbonate particles treated by my process will test over 40% of moisture when subjected to the same conditions.

In the manufacture of sodium hydroxide and precipitated calcium carbonate from sodium carbonate and calcium hydroxide according to the reaction, $$Na_2CO_3+Ca(OH)_2 \rightleftarrows CaCO_3+2NaOH$$

certain amounts of calcium hydroxide, caustic soda and sodium carbonate are left mixed with the predominating calcium carbonate. It is well known that the above reaction is reversible according to the concentrations used and that the formation of calcium carbonate from this reaction is never complete. Therefore, the calcium carbonate residue, even though thoroughly washed, is alkaline and contains varying quantities of calcium hydroxide which is preferably neutralized to render the residue satisfactory for commercial use as calcium carbonate, or precipitated chalk. I have discovered that if this surplus of alkalinity of calcium hydroxide in the calcium carbonate is neutralized with calcium bisulphite, preferably by the use of the reaction shown in my application Ser. No. 561,241, namely, $Ca(HSO_3)_2+Ca(OH)_2 \rightarrow 2CaSO_3+2H_2O$ a superior precipitated product is obtained.

By washing the precipitate with water, soluble matter is substantially completely removed. The sodium sulphite that may be present in the precipitate as the result of the above process may, if not washed out, be oxidized to sodium sulphate by the use of a small amount of oxidizing material such as a solution of calcium hypochlorite, as set forth in application Serial No. 561,241.

The superiority of the product obtained in the above process is due to unusual light refractions resulting particularly from a mixture of calcium carbonate, crystalline calcium sulphite $$(CaSO_3 2H_2O)$$

and amorphous calcium sulphite.

One of the major items of expense in preparing precipitated calcium carbonate for satisfactory commercial use has for many years presented itself in the necessary neutralization of the stronger alkaline associated substances. By the use of the reactions shown in my application Serial No. 561,241 I have found a method of neutralization that is inexpensive partly because sulphurous acid is readily produced from sulphur and partly because a solution of calcium bisulphite will produce an extraordinary yield of over 120 pounds of additional weight of filler for every 32 pounds of sulphur used. The reprecipitation of the calcium sulphite from calcium bisulphite solution is readily effected by the use of calcium hydroxide so that it may be seen that calcium carbonate, calcium hydroxide and calcium bisulphite solutions may be mixed in proportions such that the resultant substance will be a mixture of calcium carbonate and calcium sulphite in any desired or predetermined ratio. The reaction at room temperature between a solution of calcium bisulphite and calcium hydroxide or calcium carbonate produces a calcium sulphite which is mainly non-crystalline. Microscopic examination indicates a mere trace of the needle-like crystalline structure surrounded by an amorphous or non-crystalline calcium sulphite. This characteristic structure lends itself to a high percentage of retention of the filler and a high degree of opacity. I am able to control the ratio of crystalline calcium sulphite to amorphous calcium sulphite by controlling the reaction temperatures and also by controlling the amount of sulphite radical associated with the calcium bisulphite. If boiling temperatures are used, the product will be largely of crystalline structure. At temperatures around 20° C. the product will be mainly non-crystalline and without water of crystallization. The product may be identified by chemical analysis and microscopic examination.

By way of definition, it is noted that calcium sulphite in its crystalline state includes two molecules of water of crystallization and in its amorphous state no water is chemically combined therewith.

The crystalline product is obtained from complete solution rather than from equilibrium in decomposition. Crystalline calcium sulphite may be made by a method described in my application Serial No. 561,241, namely by boiling or driving off the sulphur dioxide by reduced pressure from calcium bisulphite solution in sulphurous acid. A solution of calcium acid carbonate in carbonic acid upon boiling or driving off of carbon dioxide by reduced pressure will give crystalline calcium carbonate. The crystalline material is improved, however, from the standpoints of opacity and color, by the presence of amorphous calcium sulphite.

To obtain amorphous calcium sulphite, lime water or milk of lime is added to a solution of calcium acid sulphite in sulphurous acid, the following reaction taking place:

$$Ca(HSO_3)_2+(X)H_2SO_3+(X+1)Ca(OH)_2\rightarrow (X+2)CaSO_3(\text{amorphous})+2(X+1)H_2O$$

To obtain amorphous calcium carbonate, lime water or milk of lime is added to a solution of calcium bicarbonate in carbonic acid to obtain the following reaction:

$$Ca(HCO_3)_2+(X)H_2CO_3+(X+1)Ca(OH)_2\rightarrow (X+2)CaCO_3(\text{amorphous})+2(X+1)H_2O$$

Another method of forming amorphous carbonate is by treating calcium carbonate with carbonic acid as follows:

$$(X)CaCO_3+(Y)H_2CO_3\rightarrow (X—Y)CaCO_3(\text{amorphous})+(Y)Ca(HCO_3)_2$$

In the above equations, magnesium may be substituted for part of the calcium.

Amorphous, vesicular calcium sulphite is the result of treating calcium sulphite with sulphurous acid, in the following reaction:

$$(X)CaSO_3+(Y)H_2SO_3\rightarrow (X—Y)CaSO_3(\text{amorphous, vesicular})+(Y)Ca(HSO_3)_2$$

Excellent results as a filler, may be obtained by mixing my product with other fillers such as calcium sulphate, crystalline or amorphous, or clay. These may both be added, if desired. A substance such as clay, or a substance having no regular crystalline shape may be mixed with my product particularly if it contains crystalline bodies to further improve their opacity or covering power.

In producing amorphous calcium sulphite or crystalline calcium sulphite or a mixture of the two, either chemically precipitated carbonate or mechanically pulverized carbonate may be used or sulphurous acid may be allowed to react on limestone. Chemically precipitated carbonate will give a superior product.

The following are examples of compositions prepared in accordance with the present invention:

*Example I*

| | Per cent |
|---|---|
| 300 mesh ground lime stone | 85 |
| Amorphous calcium sulphite | 8 |
| Crystalline calcium sulphite | 2 |
| Clay | 5 |

*Example II*

| | |
|---|---|
| Crystalline calcium sulphite | 20 |
| Amorphous calcium sulphite | 40 |
| English china clay | 40 |

*Example III*

| | |
|---|---|
| Calcium sulphite amorphous | 74 |
| Calcium sulphite crystalline | 18.6 |
| Calcium sulphate | 7.4 |

*Example IV*

| | Per cent |
|---|---|
| Calcium carbonate | 50 |
| Calcium sulphite amorphous | 33⅓ |
| Calcium sulphite crystalline | 16⅔ |

*Example V*

| | |
|---|---|
| Calcium carbonate | 84 |
| Magnesium carbonate | 13 |
| Alkaline earth sulphites | 3 |

While calcium carbonate is used in the preparation of the product of the present invention, it has been found that dolomite, a natural carbonate of calcium and magnesium in varying proportions, or other magnesium limestones including magnesite are also suitable for such use. The product resulting from the reaction of dolomite with calcium bisulphite solution, for instance, contains a mixture of calcium and magnesium sulphites which mixture may be employed in pigments, fillers, and loading materials of the type described. Magnesium sulphite alone may also be produced for use in the product described, from magnesium carbonate or hydrate. The carbonates may be reacted upon by the bisulphite solution to convert a given batch completely to sulphites, or a given batch of carbonates may be partially converted to form a mixture of carbonate and sulphite material.

Depending upon the amount of calcium bisulphite or sulphurous acid added to an alkaline carbonate material the resulting filler product may effect a neutral or slightly acid reaction when suspended in water or it may effect a slightly alkaline reaction if desired.

In the treatment of carbonate or other suspensions with carbonic acid, by one method carbon dioxide gas is bubbled through the suspension in an aqueous medium. The carbon dioxide may be introduced in pure form or in the form of waste gases such as combustion gases or lime kiln gases. The bubbles are preferably finely divided and uniformly distributed.

Another method is to form a cake of the carbonate, or other material to be treated, on a screen by differential pressure as in a plate or leaf type filter press and pass a solution of carbonic acid through the cake.

When using a dolomitic lime as the original raw material there may be developed during the reaction with carbon dioxide a basic magnesium carbonate. All limes contain certain amounts of magnesium. I have found it desirable in some cases to make certain that no basic magnesium carbonate be present. I can overcome this by treatment with acids, using carbonic, sulphurous or sulphuric acids for the treatment.

This basic carbonate may also be present with carbonic acid. In such case, the addition of a hydroxide such as calcium hydroxide will assist in forming the normal carbonate.

I have also found it desirable from the standpoint of opacity or hiding power not to overcome the basic carbonate by recrystallization of the magnesium salts present. These salts, particularly the basic carbonate, should be changed either to the normal carbonate or to soluble salts and washed out as the perfect crystals of magnesium salts make the filler more transparent or cause less opacity.

Mixtures of calcium and magnesium carbonate obtained by slaking a burned dolomitic limestone and treating the slaked material with carbon dioxide, when treated with aluminum sulphate, sulphurous acid, calcium or magnesium bisulphites, or zinc or copper compounds, such as carbonate, sulphates, chlorides ,nitrates, acetates and sulphites are converted into finely divided products of high quality and of unusual opacity and obscuring power. In certain instances it is not necessary to completely neutralize the alkalinity of the mixture of carbonates, a desirable product being prepared by partial neutralization of alkaline matter or by making the product slightly acid. The product obtained, when, for instance, sulphurous acid or bisulphites, the preferred acid materials, are used for changing the alkalinity, comprises calcium and magnesium sulphites, and calcium and magnesium carbonates in which the magnesium compounds may be present in substantially smaller amount than is chemically equivalent to the calcium compounds present.

If desired, material may be added to further improve the opacity of a filler or pigment of the type including calcium sulphite, calcium carbonate, magnesium sulphite, magnesium carbonate and the like. For instance, a zinc salt including zinc sulphite may be dissolved in any of its solvents including sulphurous acid solution to form a solution which when reacted with calcium carbonate or calcium hydroxide, magnesium carbonate or magnesium hydroxide will cause a precipitation of zinc compound the chemical structure of which is not definitely known. Thus a resultant mixture of zinc compound with calcium carbonate, calcium sulphite, magnesium carbonate or magnesium sulphite, or with combinations of these, may be formed.

One method is to dissolve scrap zinc in an acid, such as sulphuric acid, thereby forming a solution of zinc salt which will form a comparatively insoluble compound with the above-mentioned lime substances while at the same time obtaining a resultant product of increased opacity or hiding power over that obtained from the lime substance without the addition of the zinc salt. Less than 10% by weight of the zinc salt may be combined with the pigment to give good results.

Pigments or fillers may be treated to improve their color as well as their opacity and sizability by the following treatments:

The solid particles are maintained in a dispersed condition in water. Any of various gelatinous substances or mordants including starch, glue, casein, aluminum hydroxide, silica gel, magnesium phosphate, or tungstic materials, or other substances which form lakes with coloring matter, are distributed on the suspended particles. Mordants may be employed to the extent of under 10% of the weight of the filler. Colorings are then added such as Prussian blue, indanthrene, methylene blue, or other dyes.

Another treatment is to suspend the filler particles in water as set forth above in a mixing tank provided with stirrers. Then a reducing agent is introduced whereby the suspended particles are whitened. For instance, hydrogen sulphite gas may be bubbled through the mixture until the particles are whitened, or are somewhat paler than the original particles. Or about 1% or more of zinc sulphite may be mixed with the suspension to obtain the whitening effect.

The above treatments as well as the aforegoing treatments with acid materials to improve opacity, may be used singly or combined with each other and may be carried on in a tank provided with a stirring device. For instance, an acid treatment, or a carbon dioxide treatment, or a reduction treatment may be followed by a starch and color treatment, or a reduction treatment may be followed by a treatment with an acidic reagent.

In the treatment of filler material with acidic substances to improve the opacity and sizability thereof by corroding the surfaces of the filler particles, the acidic substances are added to suspensions of the particles in such proportions as are insufficient to completely convert the substance of the filler into the salt of the acid used. When contacting the suspension of filler particles in an aqueous medium with carbon dioxide or with sulphur dioxide, these gases are bubbled through the suspension until the particles become more opaque than the original particles, after which the passage of gases may be discontinued or the filler may be separated from the suspending medium. In the use of solutions of acidic substances as reagents these may be added to the suspensions in predetermined proportions. In the acid treatments, the proportions determine the degree of corrosion of the surfaces of the filler particles and are limited only to the extent that the acid is sufficient to effect a surface change rather than a complete chemical conversion.

The treatment of filler material set forth herein is applicable to the filler material disclosed in my copending application Serial No. 679,994, filed July 11, 1933, issued November 7, 1939 as Patent No. 2,178,606, and the methods disclosed in the latter application for improving the said filler material may be utilized in the treatment of fillers disclosed herein.

Where in the claims I use the expression "reactive, inorganic, substantially water-soluble compound having a sulphite radical," I mean sulphurous acid and/or bisulphite, either calcium, magnesium or other substantially water-soluble inorganic bisulphite.

In the various formulas given the proportions are expressed in terms of weight. Various mixtures of the materials mentioned, in widely varying proportions, may be prepared.

The product of the present invention finds its use in paper, paints, textiles, plastics, resinous materials, such as rubber and the like.

Patent No. 2,186,040, issued January 9, 1940, upon which this application for reissue is based, is a division of my copending application Serial No. 679,993, filed July 11, 1933.

What I claim is:

1. A process of preparing a pigment product, comprising treating alkaline earth metal carbonate particles in the presence of water with a reactive, inorganic, substantially water-soluble compound having a sulphite radical to partially dissolve the alkaline earth metal carbonate particles to form substantially water-insoluble, substantially opaque alkaline earth metal carbonate pigment particles having corroded surfaces.

2. A process of preparing a pigment product, comprising treating alkaline earth metal carbonate particles in the presence of water with a reactive, inorganic, substantially water-soluble compound having a sulphite radical to partially dissolve the alkaline earth metal carbonate particles to form substantially water-insoluble, substantially opaque alkaline earth metal carbonate pigment particles having corroded surfaces, and subsequently precipitating on the surface of the corroded particles alkaline earth metal sulphite.

3. A process of preparing a pigment product, comprising treating, in the presence of water, particles of material comprising calcium carbonate with a reactive, inorganic, substantially water-soluble compound having a sulphite radical to partially dissolve said particles to thereby form substantially water-insoluble, substantially opaque pigment particles comprising calcium carbonate, having corroded surfaces.

4. A process of preparing a pigment product, comprising treating dolomitic limestone particles in the presence of water with a reactive, inorganic, substantially water-soluble compound having a sulphite radical to partially dissolve said dolomitic limestone particles to thereby form substantially water - insoluble, substantially opaque dolomitics limestone pigment particles having corroded surfaces.

5. A process of preparing a pigment product, comprising treating, in the presence of water, particles of material comprising calcium carbonate and magnesium carbonate with a reactive, inorganic, substantially water-soluble compound having a sulphite radical to partially dissolve said particles to form substantially water-insoluble, substantially opaque pigment particles of material comprising calcium carbonate and magnesium compound, said particles having corroded surfaces.

6. A process of preparing a pigment product, comprising treating calcium carbonate particles in the presence of water with sulphur dioxide to thereby partially dissolve said particles, and substantially separating the resulting particles from the resulting solution to obtain substantially water-insoluble, substantially opaque calcium carbonate pigment particles having corroded surfaces.

7. A process of preparing a pigment product, comprising treating, in the presence of water, particles of material comprising calcium carbonate with sulphur dioxide thereby partially dissolving said particles, substantially separating the resulting particles from the resulting solution, and treating the resulting particles with a neutralizing agent to form substantially water-insoluble, substantially opaque pigment particles of material comprising calcium carbonate, the surfaces of which particles have been corroded.

8. A process of preparing a pigment product, comprising burning dolomitic limestone, slaking the resulting lime and magnesia to form the hydroxides, treating the same in the presence of water with sulphurous acid until a portion thereof is dissolved, and substantially separating the resulting substantially insoluble material from the resulting liquid, to form substantially water-insoluble, substantially opaque pigment particles having corroded surfaces.

9. A process of preparing a pigment product, comprising burning dolomitic limestone, slaking the resultant lime and magnesia to form the hydroxides, treating the same in the presence of water with sulphurous acid until a portion thereof is dissolved to produce corroded particle surfaces, and treating the resulting mixture with alkaline earth metal hydroxide to precipitate dissolved alkaline earth metal material in the form of alkaline earth metal sulphite on said particle surfaces to form substantially water-insoluble substantially opaque pigment particles having coated surfaces.

10. A process of preparing a pigment product, comprising treating in the presence of water a mixture comprising calcium carbonate and calcium hydroxide, obtained in the reaction between sodium carbonate and excess calcium hydroxide, with calcium bisulphite solution to form calcium sulphite from part of the calcium carbonate and to convert the calcium hydroxide in the said mixture into calcium sulphite, to obtain substantially water-insoluble, substantially opaque pigment particles having coated surfaces.

11. A process of preparing a pigment product, comprising treating, in the presence of water, particles comprising a mixture of calcium carbonate and calcium hydroxide with a reactive, inorganic, substantially water-soluble compound having a sulphite radical to partially dissolve the calcium carbonate particles to form substantially water-insoluble, substantially opaque calcium carbonate pigment particles having corroded surfaces and to precipitate calcium sulphite on the corroded surfaces.

12. A process of preparing a pigment product, comprising treating alkaline earth metal carbonate particles in the presence of water with a reactive, inorganic, substantially water-soluble compound having a sulphite radical to form substantially water-insoluble, substantially opaque alkaline earth metal carbonate pigment particles having surfaces coated with alkaline earth metal sulphite.

13. A method of producing a pigment product in an extremely finely divided state which comprises first precipitating from a lime-bearing suspension, by means of a reactive, inorganic, substantially water soluble compound having a sulphite radical, particles of normal calcium sulphite, and then improving said particles for pigment purposes by causing solution of only a portion of said normal calcium sulphite by conversion of the same into the bisulphite through reaction thereof with sulphurous acid.

14. A method of producing a pigment product in an extremely finely divided state which comprises first precipitating from a lime bearing suspension, by means of a reactive, inorganic, substantially water soluble compound having a sulphite radical, particles of normal calcium sulphite, then improving said particles for pigment purposes by causing solution of only a portion of said normal calcium sulphite by conversion of the same into the bisulphite through reaction thereof with sulphurous acid, and then adding milk of lime to substantially neutralize said bisulphite.

15. A method of producing a pigment product in an extremely finely divided state which comprises first precipitating from a lime-bearing suspension, by reaction with sulfurous acid, particles of normal calcium sulphite, improving said particles for pigment purposes by adding further sulfurous acid to effect only partial conversion and dissolution of the sulphite, and separating the remaining particles from the suspending medium.

16. A method of producing a pigment product sulphite in an extremely finely divided state which comprises first precipitating from a lime-bearing suspension, by reaction with sulfurous acid, particles of normal calcium sulfite, improving said particles for pigment purposes by adding further sulfurous acid to effect only partial conversion and dissolution of the sulphite, and then adding sufficient milk of lime to substantially neutralize the suspension.

17. A method of producing a pigment product in a finely divided state which comprises first precipitating a normal salt from a lime-bearing suspension by reacting therewith at least one of the group of acidic agents consisting of substances that will combine a sulphite radical with the lime and substances that will combine a carbonate radical with the lime, and then improving said particles for pigment purposes by treating the resulting suspension with a reactive, inorganic, substantially water-soluble compound comprising free sulfurous acid to cause only partial dissolution of the precipitated normal salt.

18. A process of preparing a pigment product in a finely divided state which comprises improving particles of the group consisting of calcium carbonate and calcium sulfite particles for pigment purposes by treating the same in the presence of water with a reactive, inorganic, substantially water soluble compound comprising free sulfurous acid to cause only partial dissolution of said particles.

JOSEPH E. PLUMSTEAD.